United States Patent
Rosenzweig (10) Patent No.: US 10,104,140 B2
(45) Date of Patent: *Oct. 16, 2018

(54) ADJUSTING NETWORK OPERATIONS BASED ON USER FEEDBACK

(71) Applicant: Amazon Technologies, Inc., Reno, NV (US)

(72) Inventor: Jesse J. Rosenzweig, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,341

(22) Filed: Oct. 3, 2016

(65) Prior Publication Data

US 2017/0026438 A1    Jan. 26, 2017

Related U.S. Application Data

(63) Continuation of application No. 13/467,397, filed on May 9, 2012, now Pat. No. 9,462,019, which is a continuation-in-part of application No. 13/436,856, filed on Mar. 31, 2012, now abandoned.

(60) Provisional application No. 61/469,979, filed on Mar. 31, 2011.

(51) Int. Cl.
*H04L 29/06* (2006.01)
*H04L 12/853* (2013.01)
*H04L 29/08* (2006.01)

(52) U.S. Cl.
CPC ...... *H04L 65/4092* (2013.01); *H04L 47/2416* (2013.01); *H04L 65/4076* (2013.01); *H04L 67/02* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 7,197,557 B1 | 3/2007 | Asar | |
| 7,373,415 B1 | 5/2008 | DeShan et al. | |
| 8,457,311 B1 | 6/2013 | Schultz et al. | |
| 2004/0098748 A1 | 5/2004 | Bo et al. | |
| 2004/0153561 A1* | 8/2004 | Dalal | H04L 65/80 709/231 |
| 2006/0045019 A1* | 3/2006 | Patzschke | H04L 41/147 370/241 |
| 2009/0013356 A1 | 1/2009 | Doerr | |
| 2009/0254657 A1* | 10/2009 | Melnyk | H04L 47/10 709/224 |

(Continued)

OTHER PUBLICATIONS

"Non Final Office Action dated Dec. 4, 2013" received in U.S. Appl. No. 13/467,397.

(Continued)

*Primary Examiner* — Henry Tsang
(74) *Attorney, Agent, or Firm* — Hogan Lovells US LLP (57) ABSTRACT

A system comprising a broadcast facility, one or more players, and an analytic service center. The broadcast facility may be configured to provide a plurality of streams. The one or more players may be configured to receive at least one of the plurality of streams and provide feedback on a user experience. The analytic service center may be configured to receive the feedback from the one or more players.

20 Claims, 6 Drawing Sheets

(56) References Cited

U.S. PATENT DOCUMENTS

| | | | |
|---|---|---|---|
| 2010/0235503 A1* | 9/2010 | Sitaraman | H04L 12/2602 709/224 |
| 2012/0151080 A1 | 1/2012 | Brueck | |
| 2013/0163953 A1 | 6/2013 | Peacock | |

OTHER PUBLICATIONS

"Final Office Action dated Apr. 7, 2014" received in U.S. Appl. No. 13/467,397.
"Non Final Office Action dated Apr. 13, 2015" received in U.S. Appl. No. 13/467,397.
"Final Office Action dated Aug. 20, 2015" received in U.S. Appl. No. 13/467,397.
"Notice of Allowance dated Jun. 14, 2016" received in U.S. Appl. No. 13/467,397.
Rackspace Document, Apr. 2009.

* cited by examiner

ADJUSTING NETWORK OPERATIONS BASED ON USER FEEDBACK

This application is a continuation of U.S. application Ser. No. 13/467,397, filed May 9, 2012, which is a continuation-in-part of U.S. application Ser. No. 13/436,856, filed Mar. 31, 2012, which claims the benefit of U.S. Provisional Application No. 61/469,979, filed Mar. 31, 2011. All of the above-referenced applications are hereby incorporated by reference in their entirety.

FIELD OF THE INVENTION

The present invention relates to video distribution generally and, more particularly, to a method and/or architecture for a web based network operations center.

BACKGROUND OF THE INVENTION

Content cached in a content delivery network or content distribution network (CDN) is generated by content producers. The content producers generate a fixed number of versions (or streams) of the content based on expected demand. Conventional content delivery solutions use an encoding device to produce several streams with a variety of predetermined encoding parameters simultaneously. The CDN delivers the content to an audience using the plurality of streams having the variety of encoding parameters. However, because the number of streams and variety of encoding parameters is fixed and the experience of consumers is not communicated to content producers, the conventional solutions can fail to provide the audience with an optimal experience.

Encoder settings are complicated. It can be difficult to know whether the encoding parameters are properly set, especially with adaptive bitrate streams across a variety of devices. An event creator may not have video expertise. The CDN may not be delivering good quality of service (QoS) to the end user. The conventional system does not have feedback on how many streams are enough. Thus, a conventional system can waste bandwidth across a network that could have been used to provide more bits for higher value content.

It would be desirable to implement a method and/or architecture for a web based network operations center.

SUMMARY OF THE INVENTION

The present invention concerns a system comprising a broadcast facility, one or more players, and an analytic service center. The broadcast facility may be configured to provide a plurality of streams. The one or more players may be configured to receive at least one of the plurality of streams and provide feedback on a user experience. The analytic service center may be configured to receive the feedback from the one or more players.

The objects, features and advantages of the present invention include providing a method and/or architecture for a web based network operations center that may (i) provide media analytics for protocols including Pantos HTTP live streaming (HLS) from Apple, Inc., Smooth Streaming from Microsoft Corp., Adobe Zeri/Flash, etc., (ii) provide feedback optimization, (iii) provide media analytics on playback experience, (iv) provide media analytics on who is watching what, and/or (v) directly feed back insights to encoding device(s) for real-time optimization of content and distribution methods.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

An embodiment of the present invention may provide a system that brings the experience of the consumer of video content on any device to the producer of the content. The information provided by the consumer to the producer may provide the producer with insight into how to improve the experience of the consumer. The system may provide an automated quality control service to alert the producer of consumer problems as early as possible. The system may also help pinpoint where in a long chain of content processing any problems may be occurring. The system may also help the producer optimize the cost of delivery to the consumer by creating analytics on who is watching, in what regions, on what devices, using what content delivery mechanism (e.g., cable company, content delivery network (CDN) such as Akamai, mobile carrier (MC) such as Verizon, etc). A system in accordance with an embodiment of the present invention may put the end consumer in the loop with the initial content producer, especially with web based video formats (e.g., from Apple, Inc., Microsoft Corporation, Adobe, Google, etc.).

Figure 1:
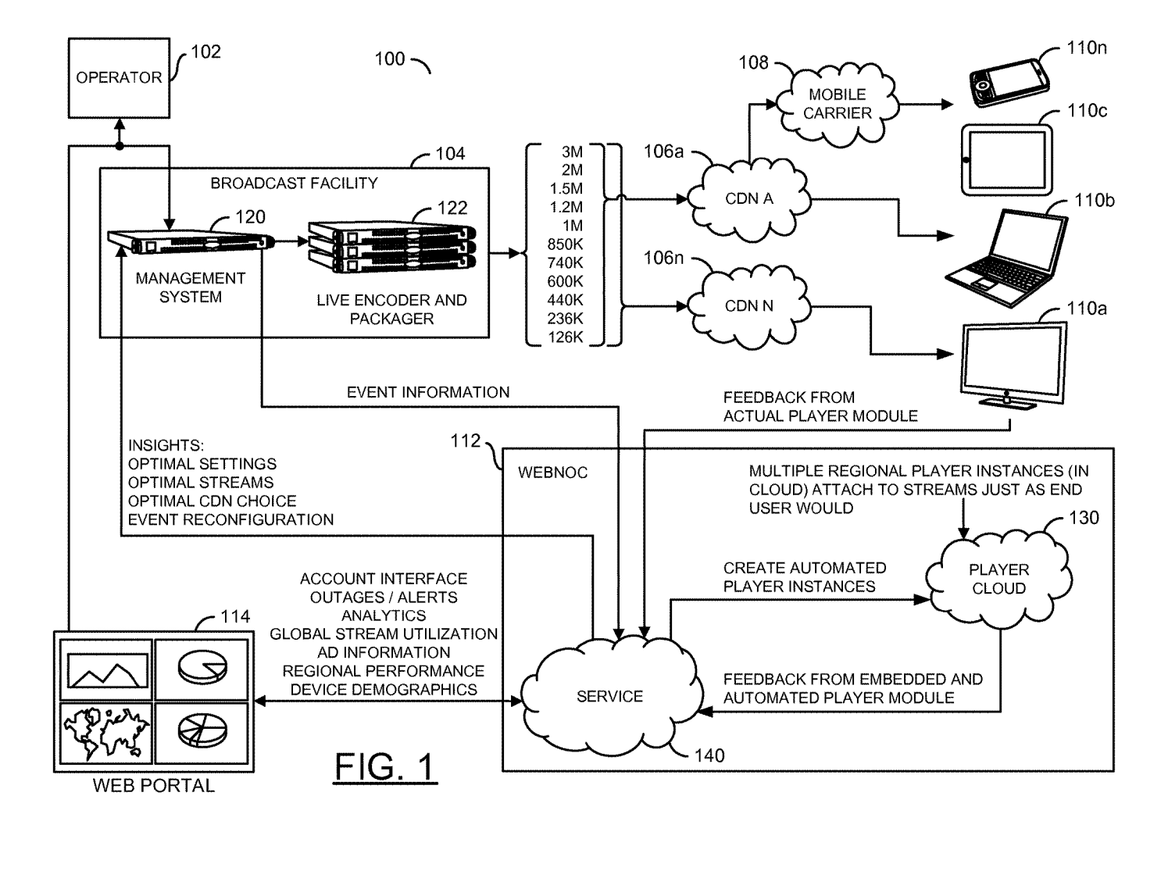
FIG. 1 is a diagram illustrating an example system in accordance with an embodiment of the present invention.

Referring to FIG. 1, a diagram is shown illustrating a system 100 in accordance with an embodiment of the present invention. The system 100 generally provides a service to help content owners and distributers to improve the media experience. The system 100 may provide video analytics on quality of outgoing streams to all devices. Generation of the analytics may be integrated with encoding devices, allowing the encoding devices to be reconfigured on the fly. The system 100 may optimize settings for content, supply best settings for devices (e.g., through a setup wizard), and save CDN costs by measuring best QoS.

In one example, an operator 102 may create an event through a broadcast facility 104. The broadcast facility 104 may generated a plurality of adaptive streams that may communicate event content via a number of content delivery networks (CDNs) 106a-106n and/or mobile carriers (MCs) 108 to a number of end users. The end users may use a number of actual player devices 110a-110n to connect to the streams available from the CDNs 106a-106n and MCs 108 and receive the event content. The actual player devices 110a-110n may be configured to provide feedback to a web-based network operations center (WEBNOC) 112.

The WEBNOC 112 may be configured to use the feedback from the player devices 110a-110n to adjust operation of the broadcast facility 104 and inform the operator 102 about the end user experience with respect to the event. The WEBNOC 112 may be configured to (i) receive event information from the broadcast facility 104, send insights (e.g. optimal settings, optimal streams, optimal CDN/MC choice, event reconfiguration, etc.) to the broadcast facility 104, and (iii) make information (e.g., account interface details, outages, alerts, analytics, global stream utilization, ad information, regional performance information, device demographics, etc.) available to the operator 102 via, for example, a web portal 114. The WEBNOC 112 may also be configured to facilitate concealment of errors in HTTP adaptive video sets using the techniques described in U.S. application Ser. No. 13/412,954, which is hereby incorporated by reference in its entirety.

In one example, the broadcast facility 104 may comprise a video encoding and packaging management system 120 and a live event encoder and packager 122. The video encoding and packaging management system 120 may be implemented, in one example, using an Elemental Conductor system (available from Elemental Technologies, Portland, Oreg.). The live event encoder and packager 122 may be implemented using, for example, one or more Elemental Live units (also available from Elemental Technologies, Portland, Oreg.).

In one example, the WEBNOC 112 may comprise a player cloud 130 and a central application (or service) 140. The live encoder and packager 122 generally communicates information with the service 140 including, but not limited to, settings, publishing points, digital rights management (DRM), player addresses, etc. When an event is started, the operator 102 may select whether or not to use dynamic quality analysis. When the event starts, a message is periodically sent to players as well as any server that is monitoring the streams. Feedback is sent back to the central service 140. The central service 140 associates the feedback with the event (e.g., using a unique event identifier). The feedback may be accessed later through the video encoding and packaging management system 120 and the live event encoder and packager 122. Analytics (e.g., media, etc.) for prior events and quality may also be viewed (e.g., through the video encoding and packaging management system 120, the live event encoder and packager 122 or a standard web browser). The end user of a device or player (e.g., iOS, android, silverlight, flash, etc.) may also click a "feedback up or down" button and/or select from various instantaneous feedback (e.g., "blocky", "stuttering", "video stopped", "audio stopped", etc).

A database of settings versus content versus quality may be built. The database may be used later so that the operator 102 may have a one button "optimize" capability that would use a piece of content and have the server offer optimal settings. The system 100 may facilitate holding CDNs and Mobile Carriers more accountable based upon historical data. The operator 102 may use the database to analyze advertisement value and standardize on user experience metrics. Consumers may chose (or search) content based on a user experience metric. The database may also receive and store feedback generated by a system such as the one described in U.S. application Ser. No. 13/412,954, which is incorporated herein by reference.

In one example, the WEBNOC 112 may be implemented as a web service based application that receives event details from the producer and receives real-time feedback on performance (e.g., playback performance and quality) from the consumers. The feedback to the service comes directly from the devices consuming the content, such as tablets, phones, computers, set top boxes (STBs), etc. The feedback generation capability is generally built into the players and player devices. For example, the players and player devices may be configured to know how to report back to the central service 140.

An automated player component may be implemented in the player cloud 130. The automated player component generally allows the content producers to automatically test their content playback without the attachment of actual users. For example, automated player instances may be created, for example, in a cloud compute service such as Amazon Elastic Compute Cloud (Amazon EC2), Rackspace, or any of various private cloud infrastructures that are spread around the world. In one example, automated player instances may be created in different (e.g., geographically) regions. In another example, the automated player instances may be configured to support the decryption of digital rights management (DRM) information as a way of testing the proper operation of a DRM service. The decryption of digital rights management (DRM) information may also provide another test as to the quality of the streams and whether the streams are properly formatted.

In one example, instantiation of automated player instances in multiple regions may allow broadcasters to test whether geo-blocking algorithms are working correctly. In another example, content providers may test system load handling by starting a number of automated player instances. The automated player instances would allow content providers to monitor content delivery network performance and health over multiple regions. The automated player instances may also be configured to automatically adjust network performance to simulate mobile device bandwidth fluctuations.

In one example, the automated player instances may be generated via an automatic player management system. The automatic player management system may be configured to manage the starting and stopping of automated player instances, for example, in the computing resources cloud(s). The automatic player management system may be configured to start and stop player instances in multiple or targeted regions using combinations of technologies and player frameworks. The various player instances may include, but are not limited to, technologies based, for example, on Microsoft Silver Light players, Adobe Flash players, HTML5 players, iOS emulators, and Android emulators. The player frameworks may be based, for example, on OSMF (open source media framework), SMF, or any other player framework. Operating systems (OSs) may include, but are not limited to, OSs from Microsoft and Linux. The hardware generally comprises a range of hardware capabilities, including, but not limited to combinations of differing central processing unit (CPU) performance and graphics processing units (GPUs). Additionally, a custom analyzer system may be implemented that monitors stream quality independent from these other technologies. In one example, the players may be web based (e.g., running in a browser). In another example, the players may be independent of a browser. When feedback from actual users is also available, the feedback data may be of higher quality.

In conventional system content playback is tested by manually test the streams by the producers, which is very tedious and error prone. Other detail that may be provided by the encoding units 122 may include, but is not limited to, some unique event identifier (e.g., name, QUID, etc.). The unique event identifier would then be used later to match the feedback with the event and allow the content owners to determine how well the event worked. A system in accordance with an embodiment of the present invention may have features that may include:

Feedback Optimization;

New media analytics—Apple HLS, MS Smooth, Adobe Zeri/Flash playback experience and who is watching what;

Insights fed back directly to encoding device(s) for real-time optimization of content and distribution methods.

As would be apparent to those skilled in the relevant art(s), the signals illustrated in FIG. 1 represent logical data flows. The logical data flows are generally representative of physical data transferred between the respective blocks by, for example, address, data, and control signals, wired and wireless channels, and/or busses. The various components of the system 100 may be implemented in hardware, software or a combination of hardware and software according to the teachings of the present disclosure, as would be apparent to those skilled in the relevant art(s).

Figure 2:
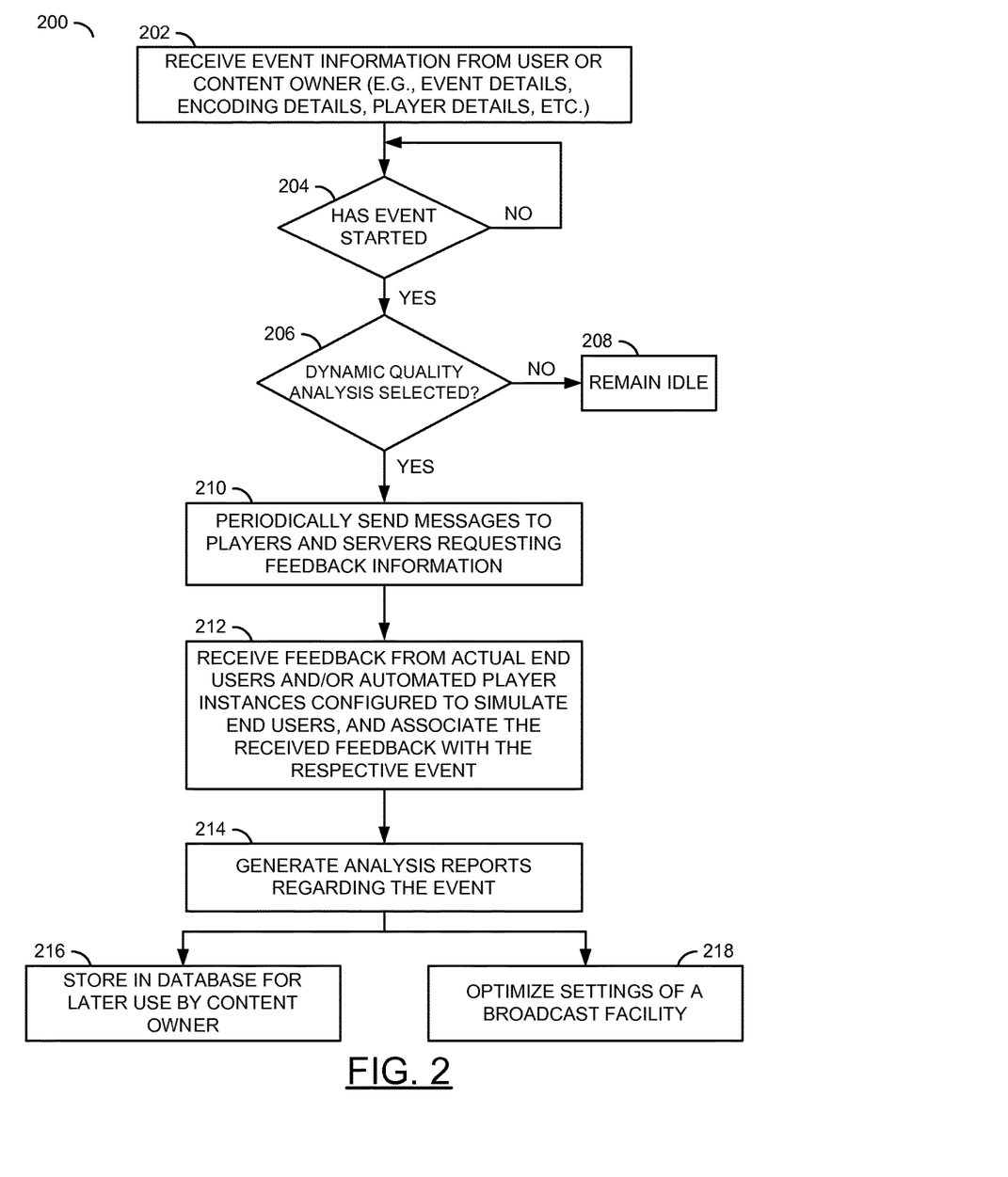
FIG. 2 is a flow diagram illustrating an example system level process using consumer feedback to adjust broadcast settings and inform content producers.

Referring to FIG. 2, a flow diagram is shown illustrating embodiment of the present invention. The process (or method) 200 generally uses consumer feedback to adjust (e.g., optimize) broadcast settings and inform content producers. In one example, the process 200 may comprise a step (or state) 202, a step (or state) 204, a step (or state) 206, a step (or state) 208, a step (or state) 210, a step (or state) 212, a step (or state) 214, a step (or state) 216, and a step (or state) 218. In the step 202, the process 200 may receive event information from a user or content owner (producer). The event information may include, but is not limited to event details, encoding details (e.g., video, audio, data), player details (e.g., edge addresses, digital rights management information, devices supported), etc. When the event information has been received, the process 200 may move to the step 204.

In the step 204, the process 200 may wait for the event to start. When the event has started, the process 200 may move to the step 206. In the step 206, the process 200 may check to determine whether a dynamic quality analysis has been selected by the user or content owner. When dynamic quality analysis has not been selected, the process 200 may remain idle. When dynamic quality analysis has been selected, the process 200 may move to the step 210. In the step 210, the process 200 may periodically send messages to players and servers requesting feedback information. When the request for feedback information has been sent, the process 200 may move to the step 212. In the step 212, the process 200 may receive feedback from actual end users and/or automated player instances created to simulate end users. The process 200 associates the feedback received with the respective event.

In one example, the feedback information (e.g., from embedded and automated player instances) may include, but is not limited to receiving bandwidth, CPU/dedicated decoding hardware utilization by decoder, frame decoding time/rate of video frames that are not displayed (e.g., dropped frames), native resolution of display device, whether player is in full screen mode or not, window size of player (e.g., when not in full screen mode), Profile/Level capability of decoder device, captioning, AV sync time stamps, whether an advertisement is being played, etc. When the requested feedback has been received, the process 200 moves to the step 214. In the step 214, the process 200 may generate one or more an analysis reports regarding the event. In one example, the analysis reports may include, but are not limited to outages, alerts, analytics, global stream utilization, advertisement information, regional performance information, device demographics information. When the analysis reports are generated, the process 200 may move to the step 216 and/or to the step 218. In the step 216, the process 200 may store the reports in a database for later use by the user or content owner. In the step 218, the process 200 may adjust settings of a broadcast facility (e.g., to optimize performance of the system). The steps 210-218 may be repeated periodically until the event ends.

Figure 3A:
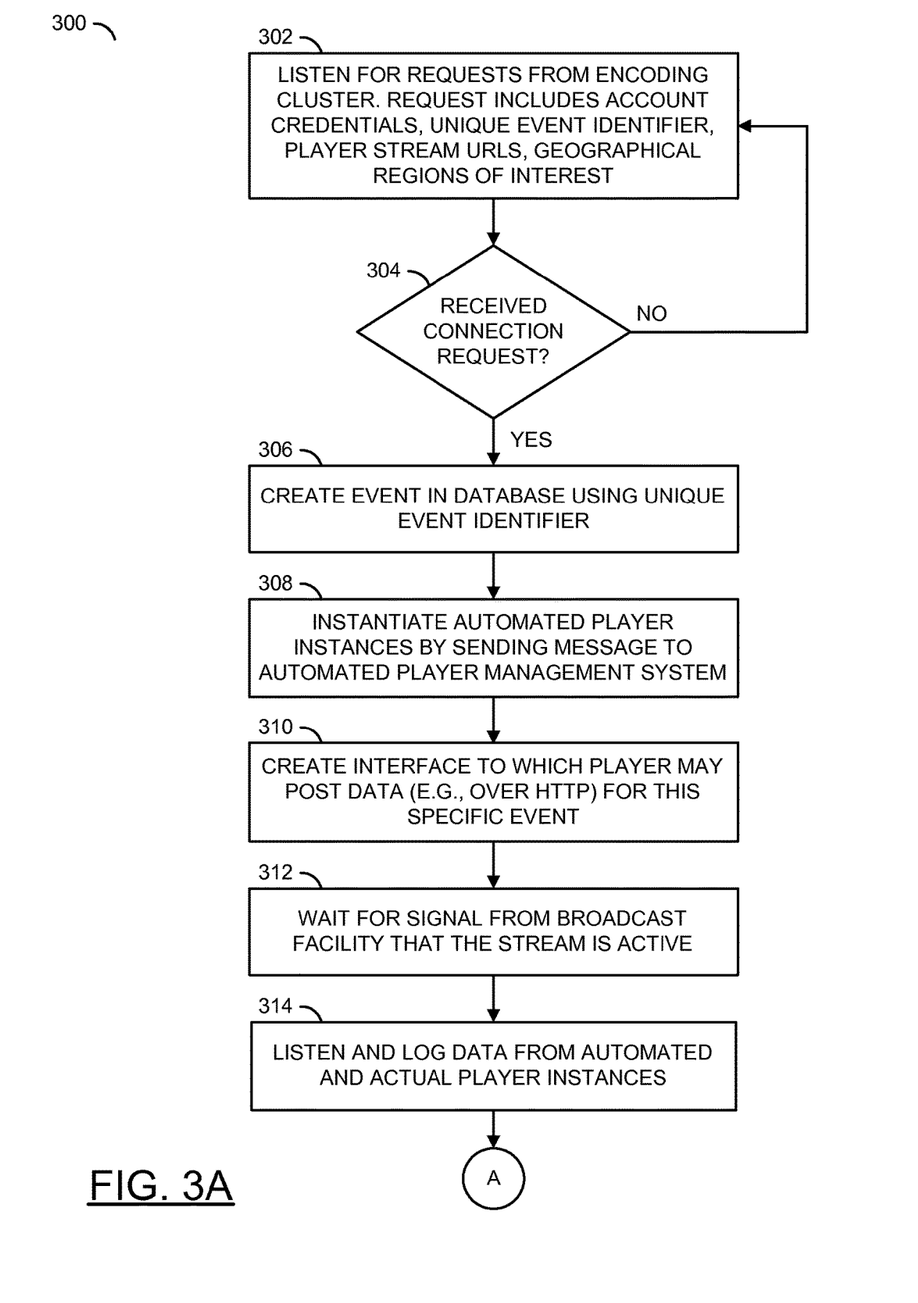
FIGS. 3A-3B is a flow diagram illustrating an example central application process in accordance with an embodiment of the present invention.
Figure 3B:
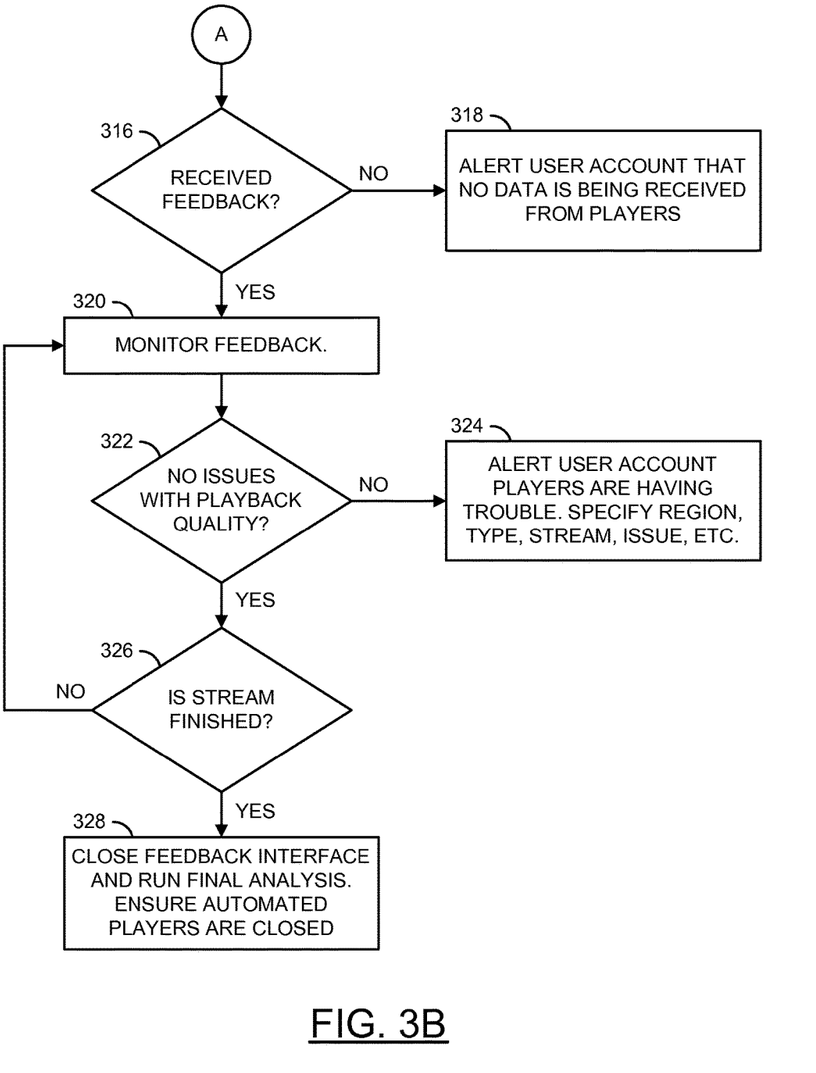

Referring to FIGS. 3A-3B, a flow diagram is shown illustrating an example central application process 300 in accordance with an embodiment of the present invention. In one example, the process (or method) 300 may comprise a step (or state) 302, a step (or state) 304, a step (or state) 306, a step (or state) 308, a step (or state) 310, a step (or state) 312, a step (or state) 314, a step (or state) 316, a step (or state) 318, a step (or state) 320, a step (or state) 322, a step (or state) 324, a step (or state) 326, and a step (or state) 328. In the step 302, the process 300 listens for requests from one or more encoding clusters. The requests may include, but are not limited to account credentials, unique event identifiers, uniform resource locators (URLs) for player streams, geographical regions of interest, etc. Periodically, the process 300 moves to the step 304 where the process 300 determines whether a connection request has been received. When no connection request has been received, the process 300 returns to the step 302 and continues listening. When a connection request is received, the process 300 moves to the step 306.

In the step 306, the process 300 creates an event entry in the database using the unique event identifier from the request. The process 300 then moves to the step 308. In the step 308, the process 300 instantiates an automated player instance in the player cloud (e.g., by sending a message to an automated player management system). When the automated player instance has been created, the process 300 moves to the step 310. In the step 310, the process 300 creates an interface for the automated player instance to post feedback data for the particular event (e.g., using hypertext transport protocol (HTTP)). When the interface has been created, the process 300 may move to the step 312. In the step 312, the process 300 waits for a signal from the broadcast facility indicating that the stream associated with the particular event is active. Upon receiving the signal from the broadcast facility, the process 300 moves to the step 314.

In the step 314, the process 300 listens for and logs data received from the automated player instance and actual player instances. In the step 316, the process 300 checks to make sure that feedback is being received. If no feedback is received, the process 300 may move to the step 318 and send an alert to a user account informing the user that no data is being received from the players. When feedback is received, the process 300 moves to the step 320 and begins monitoring the feedback for issues (e.g., quality, etc.). If there are issues (e.g., problems, etc.) with the playback quality, the process 300 may move to the step 324 to alert the user account that players are having trouble. In one example, the alert may include information specifying region, type, stream, particular issue, etc. When no issues with the playback quality are detected, the process 300 may move to the step 326 to determine whether the stream is finished. If the stream is not finished, the process 300 returns to the step 320 and continues monitoring the feedback. When the stream is finished, the process 300 may move to the step 328. In the step 328, the process 300 closes the feedback interface and performs a final (e.g., summary, etc.) analysis. The process 300 may also make sure the automated player instances that are no longer needed are closed.

Figure 4:
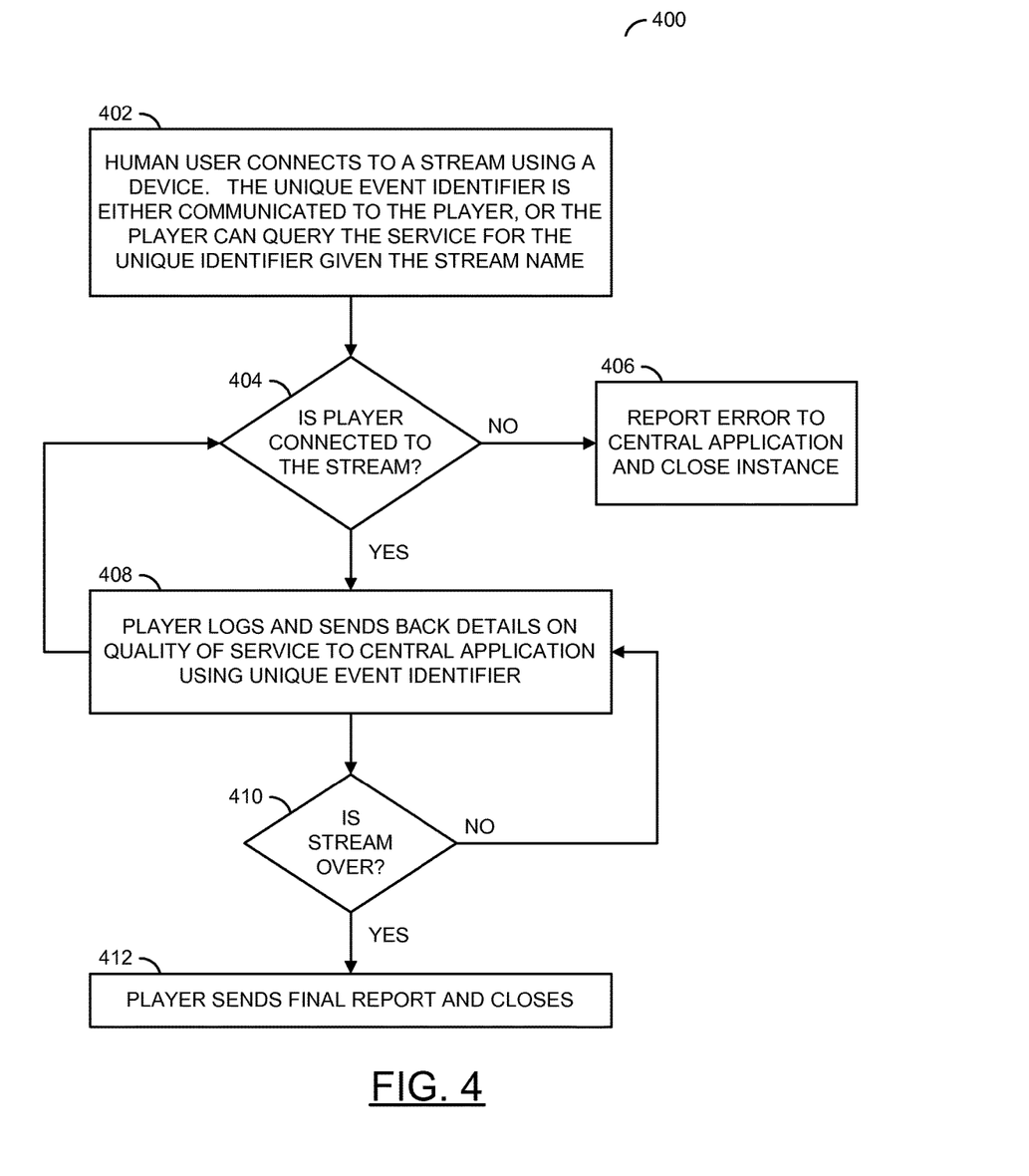
FIG. 4 is a flow diagram illustrating an example player process in accordance with an embodiment of the present invention.

Referring to FIG. 4, a flow diagram is shown illustrating an example player process 400 in accordance with an embodiment of the present invention. In one example, the process (or method) 400 may comprise a step (or state) 402, a step (or state) 404, a step (or state) 406, a step (or state) 408, a step (or state) 410, and a step (or state) 412. In the step 402, a human user causes an actual player device to connect to a stream to receive the content of the stream. The unique event identifier for the stream may be automatically communicated to the player device when the connection is made or the player device may query the service for the unique event identifier associated with the particular stream. When the player device has acquired the unique event identifier, the process 400 may move to the step 404. In the step 404, the process 400 confirms that the player is connected to the stream associated with the unique event identifier. If the player is not connected to the stream, the process 400 may move to the step 406. In the step 406, the process 400 may make a report may to the central application regarding the error and close the player instance.

When connection to the stream is confirmed, the process 400 may move to the step 408. In the step 408, the player logs and sends back details about the stream (e.g., QoS, etc.) to the central application using the unique event identifier to associate the feedback with the appropriate stream. The process 400 may then move to the step 410 to check whether the stream is over. If the stream is not over, the process 400 returns to the step 408 and continues logging and sending feedback. As long as the player is connected to the stream (e.g., step 404) and the stream is not over (e.g., step 410), the process 400 continues to log and send back details about the stream (e.g., QoS, etc.) to the central application. When the stream is over, the process 400 may move to the step 412. In the step 412, the player sends a final report to the central application and the player instance is closed.

Figure 5:
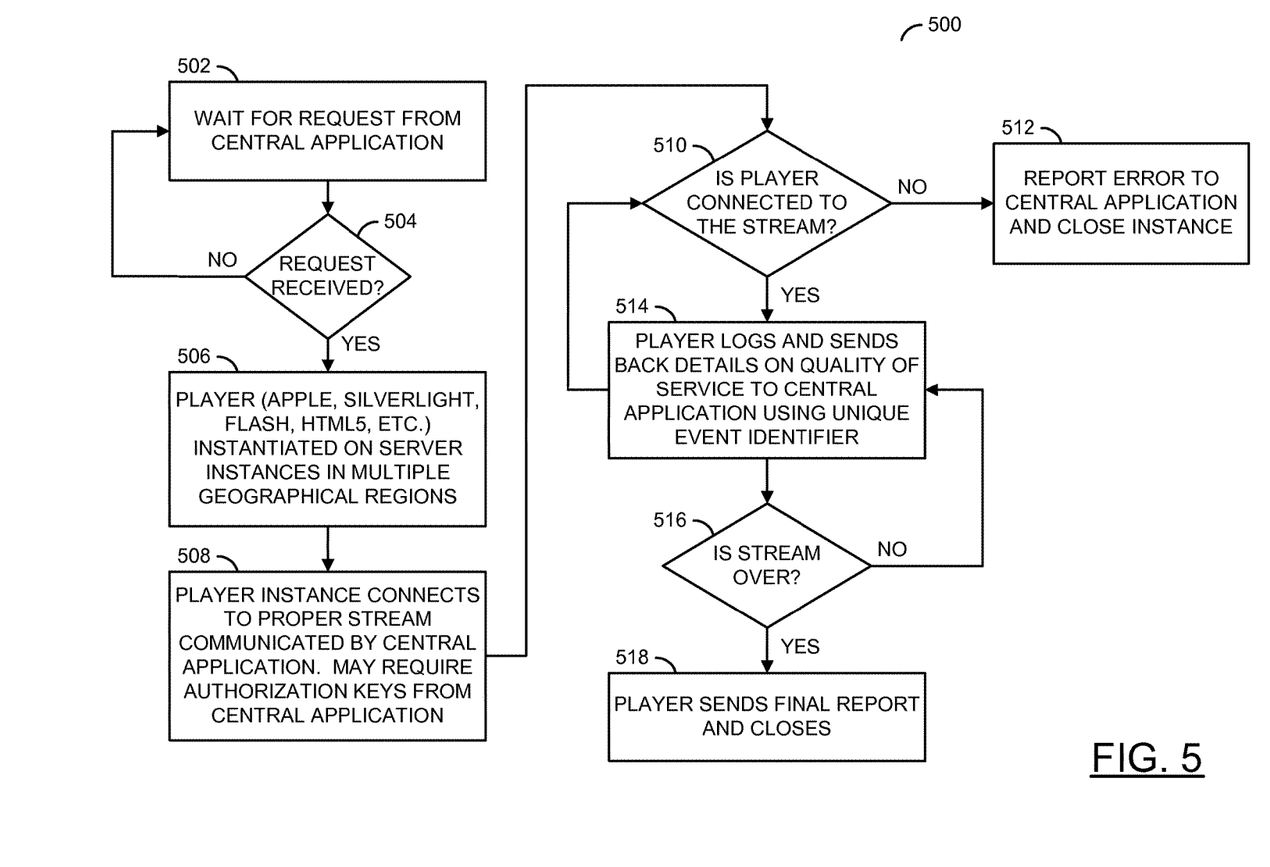
FIG. 5 is a flow diagram illustrating an example automated player instance manager process in accordance with an embodiment of the present invention.

Referring to FIG. 5, a flow diagram is shown illustrating an example automated player instance manager process 500 in accordance with an embodiment of the present invention. In one example, the process (or method) 500 may comprise a step (or state) 502, a step (or state) 504, a step (or state) 506, a step (or state) 508, a step (or state) 510, a step (or state) 512, a step (or state) 514, a step (or state) 516, and a step (or state) 518. In the step 502, the process 500 waits for a request from the central application to instantiate an automated player instance. In the step 504, the process 500 checks whether a request has been received. If a request has not been received, the process 500 returns to the step 502 and continues waiting. When a request is received, the process 500 may move to the step 506.

In the step 506, the process 500 instantiates an automated player instances on server instances in multiple geographical regions. The process 500 then moves to the step 508. In the step 508, the player instance connects with the appropriate stream communicated by the central application. In one example, authorization keys may be required from the central application. In the step 510, the process 500 checks whether the player instance has connected to the stream. If the player instance has not connected to the stream, the process 500 may move to the step 512. In the step 512, the process 500 may make a report may to the central application regarding the error and close the automated player instance.

When connection to the stream is confirmed, the process 500 may move to the step 514. In the step 514, the automated player instance logs and sends back details about the stream (e.g., QoS, etc.) to the central application using the unique event identifier to associate the feedback with the appropriate stream. The process 500 may then move to the step 516 to check whether the stream is over. If the stream is not over, the process 500 returns to the step 514 and continues logging and sending feedback. As long as the automated player instance is connected to the stream (e.g., step 510) and the stream is not over (e.g., step 516), the process 500 continues to log and send back details about the stream (e.g., QoS, etc.) to the central application (e.g., step 514). When the stream is over, the process 500 may move to the step 518. In the step 518, the automated player instance sends a final report to the central application and the automated player instance is closed.

The functions performed by the diagrams of FIGS. 2-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multichip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

What is claimed is:

1. A method comprising:
   receiving event information, the event information associated with a content stream provided by a content delivery network (CDN) and comprising bandwidth changes experienced on an end user device;
   sending a request to a player management system for a player instance to connect to the content stream using the event information, the player instance created apart from the end user device and configured to simulate the end user device by adjusting a network performance for the content stream in accordance with the bandwidth changes, wherein the adjusting of the network performance comprises starting and stopping the player instance;
   creating an interface for the player instance to provide feedback data for the content stream based at least in part on the adjusting of the network performance;
   receiving the feedback data from the player instance; and
   adjusting a parameter of the content stream based on the feedback data.

2. The method of claim 1, wherein the player management system instantiates a plurality of player instances in a plurality of geographic locations.

3. The method of claim 1, wherein the event information includes event details for a plurality of events, the plurality of events associated with a plurality of content streams provided by the CDN.

4. The method of claim 1, further comprising;
   receiving the feedback data from the end user device, the end user device receiving the content stream.

5. The method of claim 1, further comprising;
   generating an analysis report for the content stream based on the feedback data; and
   storing the analysis report in a data store.

6. The method of claim 1, wherein the player instance is created using cloud computing resources in a cloud computing service.

7. The method of claim 6, wherein the cloud computing resources associated with the player instance is released when the at least one event is finished.

8. The method of claim 1, wherein the feedback data includes at least one of CDN performance or playback performance.

9. A system comprising:
   at least one hardware processor; and
   at least one computer readable storage medium including instructions stored thereon which, when executed by the at least one hardware processor, cause the system to:
   receive event information, the event information associated with a content stream provided by a content delivery network (CDN) and comprising bandwidth changes experienced on an end user device;
   send a request to a player management system that comprises memory with software for a player instance that connect to the content stream using the event information, the player instance created apart from the end user device and configured to simulate the end user device by adjusting a network performance for the content stream in accordance with the bandwidth changes, wherein the adjusting of the network performance comprises starting and stopping the player instance;
   create an interface for the player instance to provide feedback data for the content stream based at least in part on the adjusting of the network performance;
   receive the feedback data from the player instance; and
   adjust a parameter of the content stream based on the feedback data.

10. The system of claim 9, wherein the software of the player management system instantiates a plurality of player instances in a plurality of geographic locations.

11. The system of claim 9, wherein the event information includes event details for a plurality of events, the plurality of events associated with a plurality of content streams provided by the CDN.

12. The system of claim 9, wherein the instructions further cause the system to:
   receive the feedback data from the end user device, the end user device receiving the content stream.

13. The system of claim 9, wherein the instructions further cause the system to:
   generate an analysis report for the content stream based on the feedback data; and
   store the analysis report in a data store.

14. The system of claim 9, wherein the player instance is created using cloud computing resources in a cloud computing service.

15. The system of claim 14 wherein the cloud computing resources associated with the player instance is released when the at least one event is finished.

16. The system of claim 9, wherein the feedback data includes at least one of CDN performance or playback performance.

17. A system comprising:
   a player management system comprising memory with software that is configured to create a player instance operated apart from at least one end user device, the player instance configured to simulate an end user device and provide feedback data associated with playback of a content stream received from a content delivery network (CDN); and
   a network operations center comprising at least a web service based application configured to:

receive event information, the event information associated with the content stream provided by the CDN and comprising bandwidth changes experienced on the end user device;

send a request to the player management system for the player instance to connect to the content stream using the event information;

create an interface for the player instance to provide feedback data for the content stream, the player instance simulating the end user by adjusting a network performance for the content stream in accordance with the bandwidth changes, wherein the adjusting of the network performance comprises starting and stopping the player instance;

receive the feedback data from the player instance based at least in part on the adjusting of the network performance; and adjust a parameter of the content stream based on the feedback data.

18. The system of claim 17, wherein the software of the player management system instantiates a plurality of player instances in a plurality of geographic locations.

19. The system of claim 17, wherein the event information includes event details for a plurality of events, the plurality of events associated with a plurality of content streams provided by the CDN.

20. The system of claim 17, wherein the feedback data includes at least one of CDN performance or playback performance.

* * * * *